US010180916B2

(12) United States Patent
Rashid et al.

(10) Patent No.: US 10,180,916 B2
(45) Date of Patent: Jan. 15, 2019

(54) MANAGING COPY OPERATIONS IN COMPLEX PROCESSOR TOPOLOGIES

(71) Applicant: Nvidia Corporation, Santa Clara, CA (US)

(72) Inventors: M. Wasiur Rashid, San Jose, CA (US); Gary Ward, Santa Clara, CA (US); Wei-Je Robert Huang, Fremont, CA (US); Philip Browning Johnson, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 58 days.

(21) Appl. No.: 14/958,714

(22) Filed: Dec. 3, 2015

(65) Prior Publication Data

US 2017/0161099 A1  Jun. 8, 2017

(51) Int. Cl.
*G06F 9/46* (2006.01)
*G06F 13/00* (2006.01)

(52) U.S. Cl.
CPC .................................. *G06F 13/00* (2013.01)

(58) Field of Classification Search
None
See application file for complete search history.

(56) References Cited

U.S. PATENT DOCUMENTS

| 2012/0206463 | A1* | 8/2012 | Reid | G06F 9/5027 345/503 |
| 2014/0109102 | A1* | 4/2014 | Duncan | G06F 9/3851 718/103 |
| 2014/0344528 | A1* | 11/2014 | Kini | G06F 13/1663 711/151 |

* cited by examiner

*Primary Examiner* — Kenneth Tang
(74) *Attorney, Agent, or Firm* — Artegis Law Group, LLP

(57) ABSTRACT

A copy subsystem within a processor includes a set of logical copy engines and a set of physical copy engines. Each logical copy engine corresponds to a different command stream implemented by a device driver, and each logical copy engine is configured to receive copy commands via the corresponding command stream. When a logical copy engine receives a copy command, the logical copy engine distributes the command, or one or more subcommands derived from the command, to one or more of the physical copy engines. The physical copy engines can perform multiple copy operations in parallel with one another, thereby allowing the bandwidth of the communication link(s) to be saturated.

20 Claims, 14 Drawing Sheets

MANAGING COPY OPERATIONS IN COMPLEX PROCESSOR TOPOLOGIES

BACKGROUND OF THE INVENTION

Field of the Invention

Embodiments of the present invention relate generally to systems with multiple processing entities and, more particularly, to managing copy operations in complex processor topologies.

Description of the Related Art

A conventional copy engine is a hardware unit that copies data from one location to another location. A graphics processing unit (GPU) may include several such copy engines, ones that are configured to "push" local data to external locations, and others that are configured to "pull" data from external locations into local memory.

For example, a GPU could include a first copy engine configured to copy data from the frame buffer within the GPU to system memory associated with a central processing unit (CPU). The GPU could also include a second copy engine configured to copy data from the system memory of the CPU into the frame buffer of the GPU. In another configuration, the GPU could include just one copy engine configured to "push" data to the CPU, and the CPU could include one copy engine configured to "push" data to the GPU. In other configurations, the GPU could include one or more copy engines, each configured to both "push" and "pull" data. In such configurations, if a copy engine were instructed to perform both types of copy operations, communication link bandwidth may not be efficiently utilized. Generally, a device driver executing on the GPU manages the operation of the copy engine(s) associated with the GPU.

In simple processor topologies such as that described above, the GPU and CPU are coupled together via a communication link, such as a peripheral component interconnect express (PCIe) link, for example. Each copy engine is assigned a dedicated channel of the communication link and configured to perform copy operations across that channel. With two copy engines assigned to two different channels and configured to "push" and "pull" data, respectively, the GPU can implement a bidirectional communication link with a CPU. The bandwidth with which copy operations may be performed across that link depends on the native speed of the communication link channels. In order to increase copy bandwidth across the communication link, the number of copy engines may be increased, and an additional communication link channel may be assigned to each additional copy engine.

For example, in the exemplary topology described above, the GPU could include two copy engines configured to "push" data to the CPU across two communication link channels, and two copy engines configured to "pull" data from the CPU across two additional communication link channels, thereby doubling the copy bandwidth compared to the previously described configuration. The device driver executing on the GPU would need to manage the copy operations performed by all four copy engines, and potentially load balance copy operations across the associated channels.

In a more complex processor topology, a CPU may be coupled to multiple GPUs that, in turn, may be coupled to one another, or to a single GPU that includes multiple processing entities that, in turn, may be coupled to one another. For example, the CPU could be coupled to two GPUs via PCIe links, while each GPU could be coupled to the other GPU via a chip-to-chip communication link, such as, e.g., an NVlink High Speed Interconnect. Each GPU in this configuration could include four copy engines—a first copy engine to "push" data to the CPU, a second cop engine to "pull" data from the CPU, a third copy engine to "push" data to the other GPU, and a fourth copy engine to "pull" data from the other GPU.

Other configurations of copy engines are possible in the exemplary topology described above. However, as a general matter, to support bidirectional copying between any two processors, at least two copy engines are needed. Further, to increase copy bandwidth between processors or processing entities, additional copy engines are needed and additional communication link channels must be assigned to those additional copy engines. The corresponding device driver must manage the additional copy engines and load balance copy operations across all relevant channels.

One drawback of the approach described above is that highly complex processor topologies are becoming increasingly common, but sufficient copy engines cannot be included within each processor to support high-bandwidth copy operations between neighboring processors. For example, multiple CPUs could be coupled to vast arrays of interconnected GPUs. Using the above approach, each processor would need a different copy engine for each channel across for which copy operations are to be performed, potentially requiring an inordinate number of copy engines. Additionally, copy engines are hardware units, and processors generally cannot include more than a handful of such units without increasing the size of the processors beyond acceptable limits. Consequently, the complexity of processor topologies can be substantially limited by the inability to include sufficient numbers of copy engines in processors.

Another drawback of the above approach is that, because the device driver on each GPU must manage all copy engines in the corresponding GPU, the device driver executing on a given GPU must load balance copy operations across the various copy engines. That load balancing must occur in a manner that depends on the unique processor topology. For example, if a GPU is coupled to one neighboring GPU via four channels of a communication link and coupled to another neighboring GPU by six channels of a communication link, the driver must account for these link width differences when load-balancing copy operations that involve those neighboring processors. Since GPUs may be coupled together according to a wide variety of different topologies with widely varying link widths, the driver must be preprogrammed to account for all such potential topologies, many of which can be highly complex. If the driver is not preprogrammed to handle a specific topology, then copying functionality may be limited or unavailable for that topology. Consequently, the driver must be exceedingly complex. As is well known, highly complex software inevitably creates maintainability, portability, and scalability issues.

As the foregoing illustrates, what is needed in the art is a more effective approach for managing copy operations in complex processor topologies.

SUMMARY OF THE INVENTION

One embodiment of the present invention sets forth a copy subsystem, including a first logical copy engine configured to receive a first set of copy commands transmitted by a device driver, and a first set of physical copy engines coupled to the first logical copy engine, where each physical copy engine is configured to execute at least one command included in the first set of copy commands on behalf of the first logical copy engine.

At least one advantage of the disclosed technique is that a processor can be configured with any number of different neighboring processors, and connected to those neighboring processors via communication links having any range of widths, without requiring the device driver to perform load balancing of copy operations across the different links.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
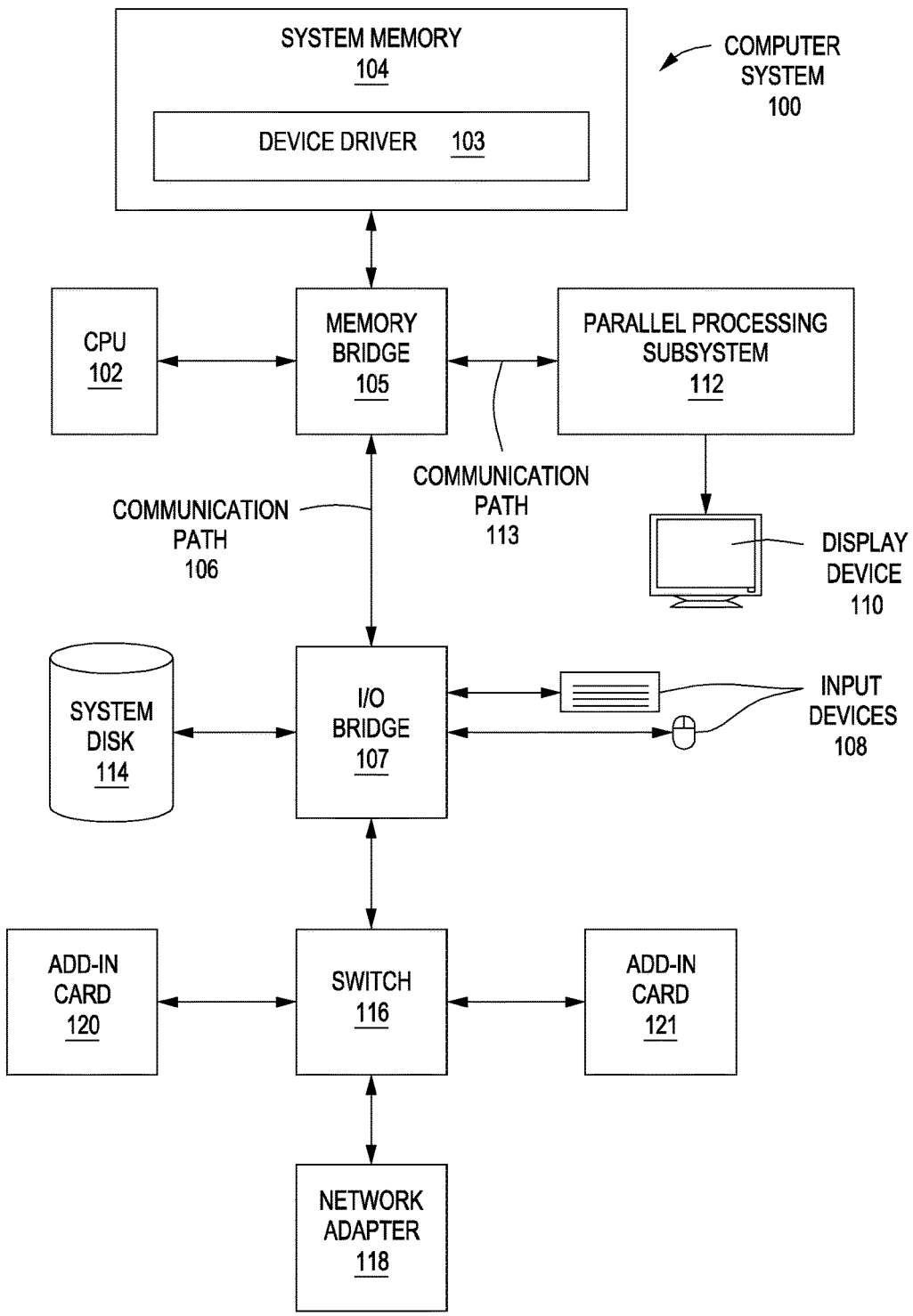
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more of the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
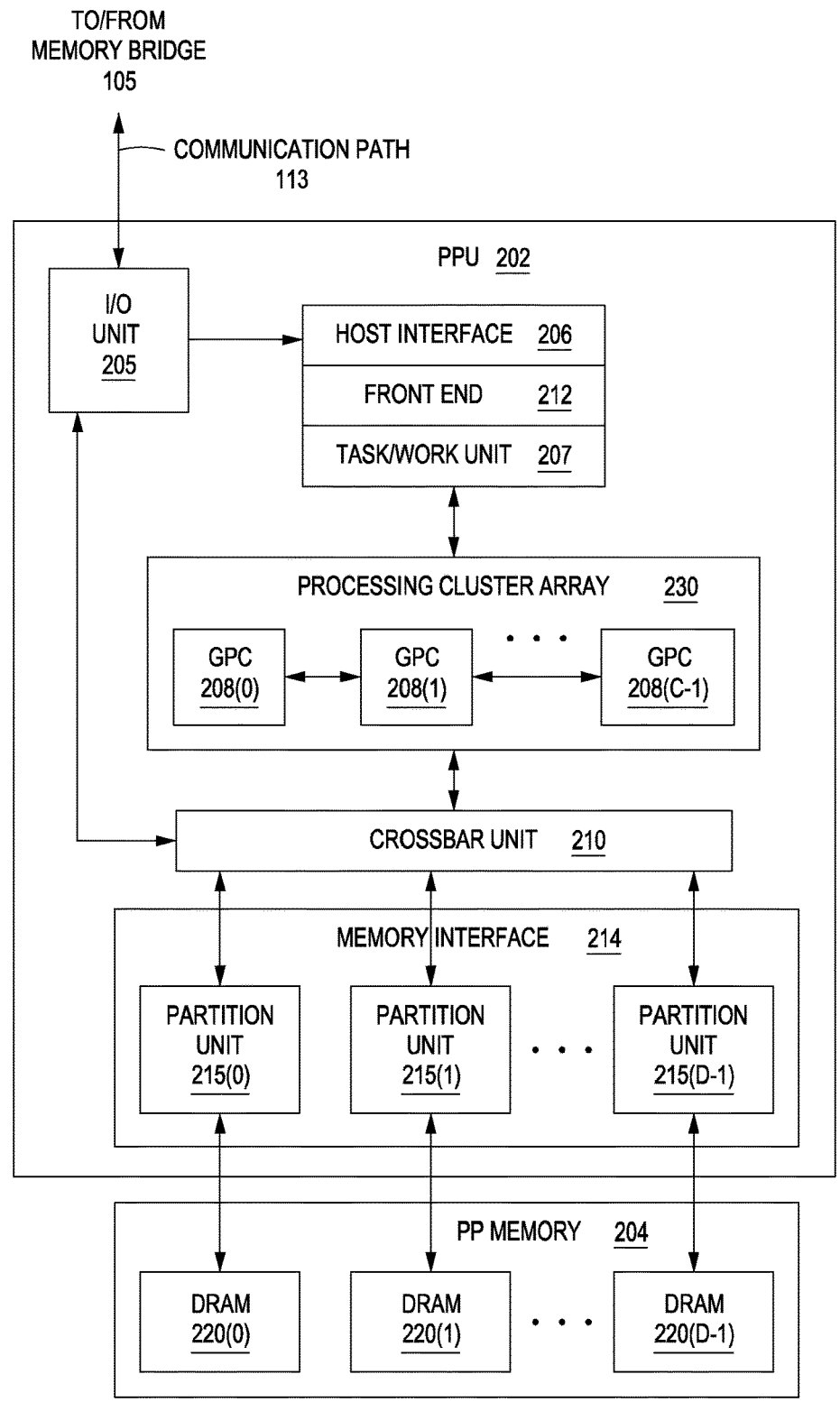
FIG. 2 is a block diagram of a parallel processing unit included in the parallel processing subsystem of FIG. 1, according to various embodiments of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Managing Copy Operations in Complex Processor Topologies

Figure 3A:
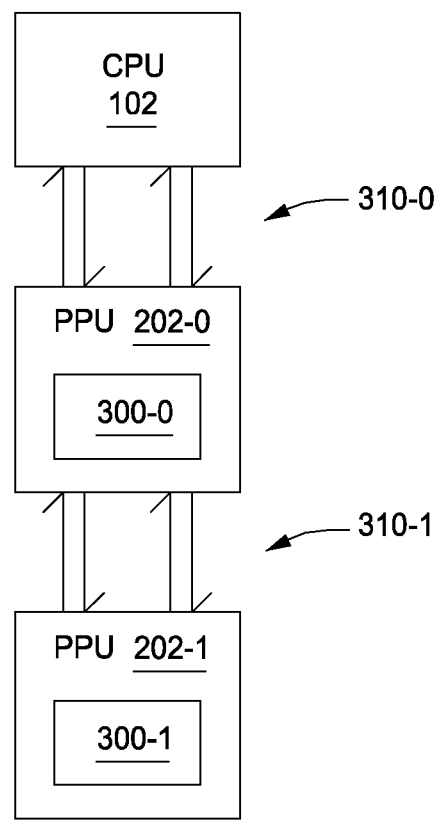
FIG. 3A-3B illustrate exemplary processor topologies where copy operations are managed by a copy subsystem, according to various embodiments of the present invention.
Figure 3B:
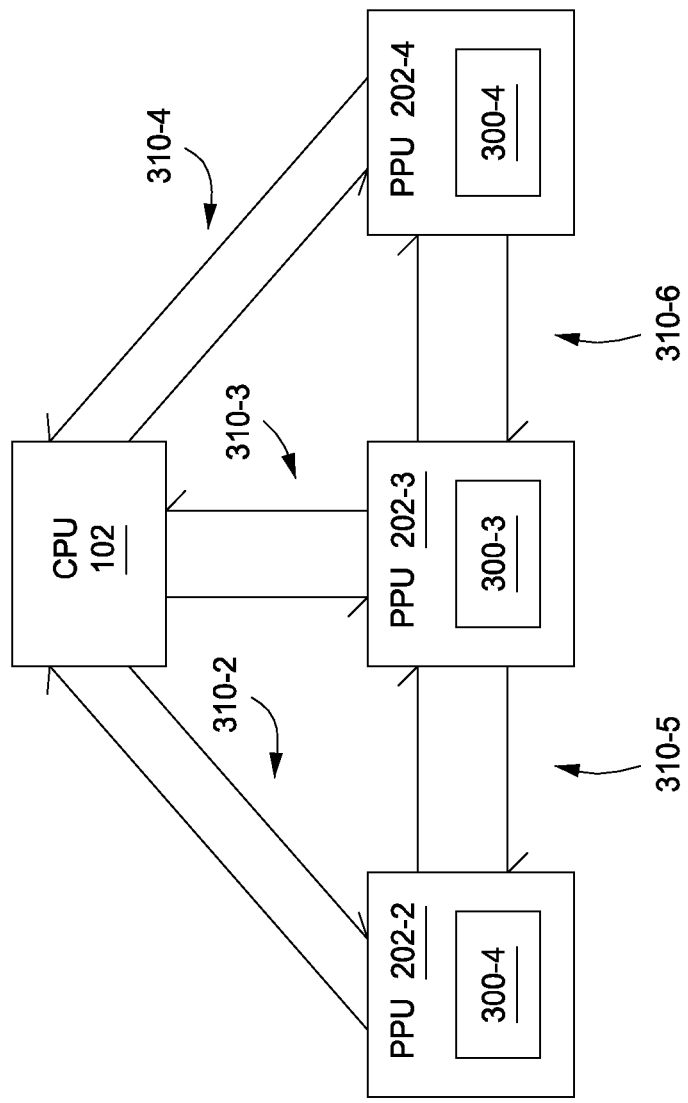

FIG. 3A-3B illustrate exemplary processor topologies where copy operations are managed by a copy subsystem, according to various embodiments of the present invention. As shown in FIG. 3A, CPU 102 of FIG. 1 is coupled to a PPU 202-0 via communication link 310-0. PPU 202-0 is coupled to PPU 202-1 via communication link 310-1. Each of PPUs 202-0 and 202-1 is an instance of PPU 202 shown in FIG. 2. PPU 202-0 includes a copy subsystem 300-0, and PPU 202-1 includes a copy subsystem 300-1.

Communication link 310-0 may be any technically feasible data connector configured to transport data between CPU 102 and PPU 202-0. In one embodiment, communication link 310-0 is a peripheral component interconnect express (PCIe) connector. Communication link 310-0 may include any number of separate channels across which data may travel. Copy subsystem 300-0 may be assigned a subset of those channels in order to perform copy operations with CPU 102. Four such channels are shown in FIG. 3A; two which allow copy subsystem 300-0 to copy data to CPU 102, and two which allow copy subsystem 300-0 to copy data from CPU 102. Persons skilled in the art will understand that the specific number and configuration of channels depicted in FIG. 3A are meant for illustrative purposes only.

Communication link 310-1 may be any technically feasible data connector configured to transport data between PPU 202-0 and PPU 202-1. In one embodiment, communication link 310-1 is an NVlink High-Speed Interconnect. Communication link 310-1 may include any number of separate channels across which data may travel. Copy subsystems 300-0 and 300-1 may be assigned a subset of those channels in order to perform copy operations with one another. Four such channels are shown in FIG. 3A; two which allow copy subsystem 300-0 or copy subsystem 300-1 to copy data from PPU 202-0 to PPU 202-1, and two which allow copy subsystem 300-0 or copy subsystem 300-1 to copy data from PPU 202-1 to PPU 202-0. Again, persons skilled in the art will understand that the specific number and configuration of channels depicted in FIG. 3A are meant for illustrative purposes only. FIG. 3B illustrates another processor topology where copy operations associated with a PPU are managed by a copy subsystem.

FIG. 3B illustrates CPU 102 coupled to PPUs 202-2, 202-3, and 202-4 via communication links 310-2, 310-3, and 310-4, respectively. PPUs 202-2 and 202-3 are coupled together by communication link 310-5, and PPUs 202-3 and 202-4 are coupled together by communication link 310-6. Communication links 310-2, 310-3, and 310-4 may be PCIe links, while communication links 310-5 and 310-6 may be NVlink High-Speed Interconnects. PPUs 202-2, 202-3, and 202-4 include copy subsystems 300-4, 300-5, and 300-6, respectively.

Each communication link 310 shown in FIG. 3B may include any number of separate channels across which data may travel. One or more copy subsystems 300 coupled to a given communication link 310 may be assigned a subset of the channels associated with that link in order to perform copy operations a neighboring processor, i.e., CPU 102 or a PPU 202. Each communication link 310 in FIG. 3B includes two such channels, although persons skilled in the art will understand that the specific number and configuration of channels depicted in FIG. 3B are meant for illustrative purposes only, and that each different communication channel 310 may include any specific number of channels.

Referring generally to FIGS. 3A-3B, each copy subsystem 300 shown is configured to manage copy operations with one or more neighboring processors in a manner that allows copy bandwidth across the corresponding communication link(s) 310 to be saturated. Each copy subsystem 300 may perform this functionality in any processor topology, including the two exemplary topologies shown. Further, each PPU 202 may execute a device driver, such as, e.g. device driver 103 shown in FIG. 1, which interfaces with the corresponding copy subsystem 300 in a consistent fashion regardless of the specific processor topology and/or communication link 310 width. In addition, the techniques described herein are applicable to any processor topology beyond those shown in FIGS. 3A-3B, including those which involve multiple processing entities (such as, e.g. GPCs), each including an instance of a copy subsystem, within one PPU.

For example, a device driver 103 executing on PPU 202-0 of FIG. 3A would populate a single work queue associated with copy subsystem 300-0 for copying data across the four channels of communication link 310-1. The device driver 103 need not load-balance copy operations across those four channels, because copy subsystem 300-0 performs load balancing functionality. Similarly, a device driver 103 executing on PPU 202-2 of FIG. 3B would populate a single work queue associated with copy subsystem 300-2 for copying data across the two channels of communication link 310-5. The device driver 103 need not load balance copy operations across those two channels, because copy subsystem 300-4 performs load balancing functionality.

Figure 4:
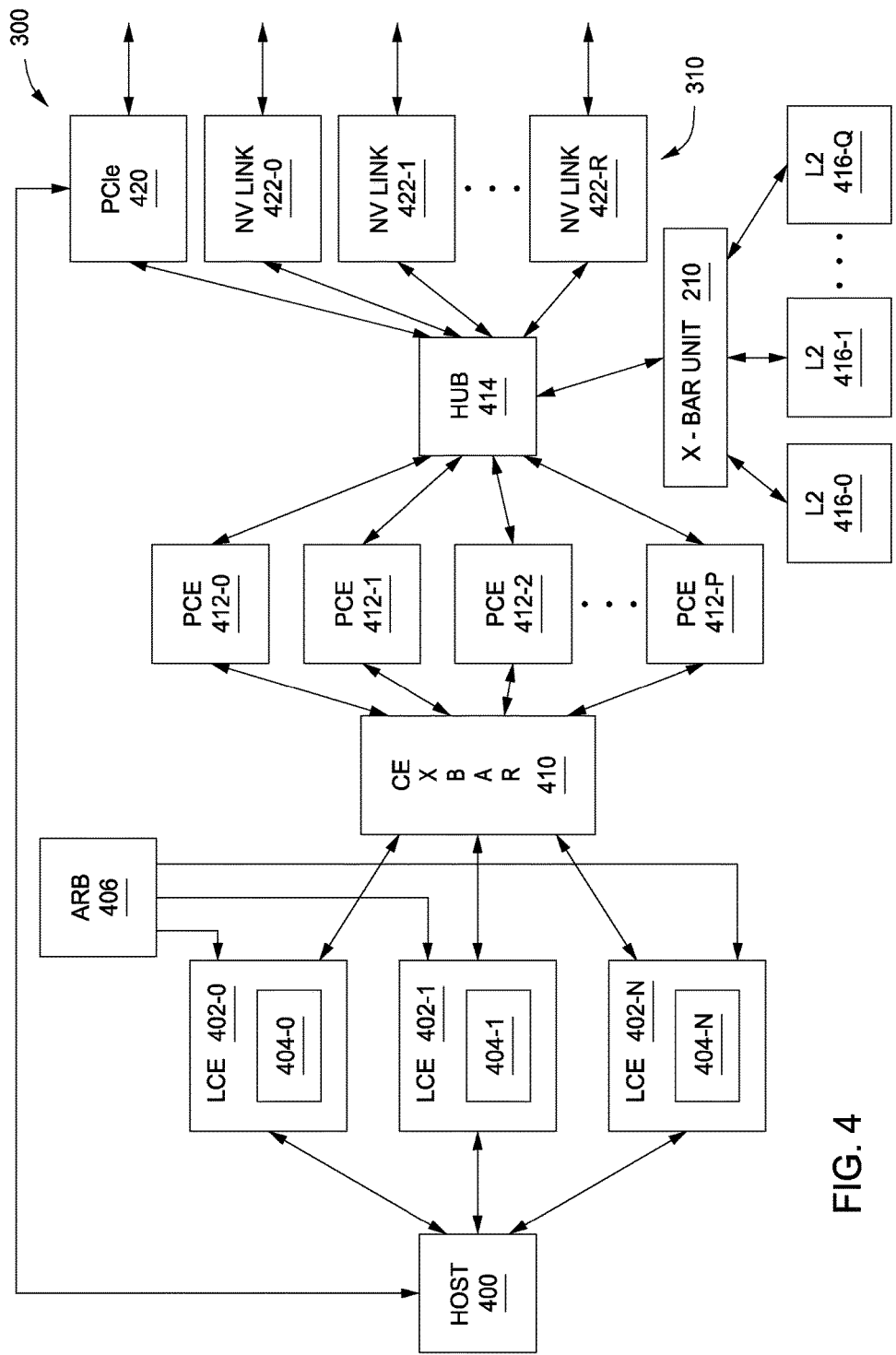
FIG. 4 is a block diagram of the copy subsystem of FIGS. 3A-3B, according to various embodiments of the present invention.

Thus, as a general matter, a given copy subsystem 300 allows the associated PPU 202 to copy data to and from neighboring processors independently of the specific number of channels within the communication links 310 that couple those neighboring processors. Further, each copy subsystem 300 manages synchronization between dependent copy operations, thus alleviating the burden of synchronization from the associated device driver 103. Accordingly, the device drivers 103 executed by PPUs 202 may be significantly simpler to implement. FIG. 4 illustrates an exemplary copy subsystem 300, which may be included in PPU 202 of FIG. 2, in greater detail.

FIG. 4 is a block diagram of the copy subsystem of FIGS. 3A-3B, according to various embodiments of the present invention. Copy subsystem 300 may be included in PPU 202 of FIG. 2, and may be managed by device driver 103 shown in FIG. 1. As shown, copy subsystem 300 includes a host 400 and logical copy engines (LCEs) 402-0 through 402-N. LCEs 402-0 through 402-N include first-in, first-outs (FIFOs) 404-0 through 404-N, respectively. Copy subsystem 300 also includes arbiter (ARB) 406, copy engine crossbar (CE X-bar) 410, physical copy engines (PCEs) 412-0 through 412-P, hub 414, x-bar unit 210 (also shown in FIG. 2), L2 caches 416-0 through 416-Q, PCIe 420, and NVLinks 422-0 through 422-R.

Host 400 is coupled to each LCE 402. Each LCE 402 is coupled to ARB 406 and to CE X-bar 410. CE X-bar 410 is coupled to each PCE 412. Each PCE 412 is coupled to hub 414. Hub 414 is coupled to x-bar unit 210 that, in turn, is coupled to L2 caches 416. Hub 414 is also coupled to PCIe 420 and NVLinks 422. PCIe 420 and/or NVLinks 422 may implement communication links 310 shown in FIGS. 3A-3B, and thereby allow communication with processors that neighbor the PPU 202 where copy subsystem 300 resides. For example, PCIe 420 may couple copy subsystem 300 to CPU 102, while NVLinks 422 may couple copy subsystem 300 to a neighboring PPU 202. Hub 414 allows specific PCEs 412 to be coupled to different channels of communication links 310. In some embodiments, hub 414 may be omitted.

In operation, host 400 receives copy commands from CPU 102 via PCIe 420. Copy commands are associated with copy data. "Copy data" generally refers to data that is to be copied to another processor, such as a neighboring PPU 202. "Copy commands" generally refers to commands for copying received copy data to the neighboring processor(s), or commands for copying data resident on a neighboring processor to local memory. Host 400 temporarily stores received copy commands in push buffers (not shown) resident in L2 caches 416. Host 400 then forwards received copy commands to LCEs 402 for processing.

Each copy command is associated with one of multiple different command streams, where each command stream corresponds to a different LCE 402. Device driver 103 configures the various command streams. Upon receiving copy commands within a given command stream, host 400 buffers and then transmits those commands to the corresponding LCE 404.

In one embodiment, when host 400 receives a copy command associated with copy data that exceeds a certain size, host 400 may perform an operation referred to herein as "copy splitting." Generally, copy splitting involves splitting large portions of copy data into smaller portions and/or manipulating copy commands to break up a single big copy into a set of smaller copies. In one embodiment, when copy data exceeds 8 kilobytes (KB), host splits the copy data into two or more portions, where each portion includes 8 KB or less. Copy splitting allows the latency involved with individual copy operations to be more predictable. Specifically, since copy data associated with copy commands received by host 400 could have any particular size, the latency needed to perform an arbitrary copy operation is unpredictable. However, by splitting all copy data that exceeds a certain size into smaller copy operations having a limited size, the latency needed to perform each such operation is correspondingly limited. When copy data is subject to copy splitting, the original copy command associated with the copy data may be split in corresponding fashion to generate a different copy sub-command for each split portion of copy data. Thus, each LCE 402 may receive a stream of copy sub-commands corresponding to 8 KB copy data, each of which is derived from the same copy command corresponding to greater than 8 KB of copy data. In one embodiment, each LCE 402 implements the copy splitting functionality discussed above.

When a given LCE 402 receives a copy commands from host 400, the LCE 402 distributes each such command to a specific PCE 412 via CE X-bar 410. A given PCE 412 processes received copy commands to determine a source address, and then sends out read requests to the source to fetch the data, and also uses the copy commands to determine a destination address to send out writes (with the data received from the reads) to that destination.

CE X-bar 410 is configured to implement a configurable mapping between LCEs 402 and PCEs 412. Thus, any LCE 402 may distribute a copy command to any PCE 412 to which that LCE 402 is mapped via x-bar 410. Various mappings between LCEs 402 and PCEs 412 are described in greater detail below in conjunction with FIGS. 5A-5D. When a given PCE 412 receives a copy command, the PCE 412 may perform one of two different actions, depending on the nature of the command.

More specifically, copy commands may be "push" type commands or "pull" type commands. A "push" type command indicates that copy data stored in a local memory should be copied to a neighboring processor (i.e., "pushed"). A "pull" type command indicates that copy data is to be received from a neighboring processor (i.e., "pulled"). When processing a "push" type command, the given PCE 412 accesses the copy data from the appropriate L2 cache 416 and transmits that copy data, via hub 414, across PCIe 420 or an NVLink 422 to a neighboring processor. When processing a "pull" type command, the given PCE 412 causes the neighboring processor to transmit the copy data across PCIe 420 or an NVlink 422 to hub 414. Hub 414 then stores the received copy data into an L2 cache 416. Data can also be copied directly to local memory, thereby bypassing L2 cache 416.

Copy subsystem 300 may include a number of PCEs 412 that is equal or unequal to the number of different channels of communication links 310 that are designated for copy operations. For example, if PCIe 420 included two channels designated for copy operations, and each of three NVLinks 422 included four separate channels designated for copy operations, then copy subsystem 300 could include fourteen PCEs 412. However, there is no fixed association between PCEs 412 and channels of communication links 310. Similarly, the number of PCEs within copy subsystem 300 is generally independent of the number of LCEs 402. Thus, the number of PCEs 412 may be changed, e.g., for manufacturability reasons or when performing floor-sweeping, without affecting device driver 103. In practice, copy subsystem 300 includes six LCEs 402 and six PCEs 412, although other numbers of LCEs 402 and PCEs 412 are possible. In one embodiment, one LCE 402 may be dedicated to performing graphics-related copy operations, while the remaining LCEs 402 may be available for generic copy operations. The dedicated graphics LCE 402 may be associated with a graphics-specific command stream.

As mentioned above, the number of command streams implemented by device driver 103 may be equal to the number of LCEs 402 and independent of the number of PCEs 412. Thus, device driver 103 may issue copy commands independently of the number of channels of communication links 310 used for copying. Device driver 103 need only manage a specific number of command streams, and LCEs 402 then distribute the commands associated with those command streams across PCEs 412. In this manner, LCEs 402 may perform load-balancing operations (instead of device driver 103 performing such load balancing) in order to fully saturate PCEs 412 with copy operations to be performed.

The specific technique implemented by LCEs 402 to distribute copy commands to PCEs 412 depends on the particular mapping of LCEs 402 to PCEs 412. As mentioned previously, CE X-bar 410 is configured to implement a programmable mapping between LCEs 402 and PCEs 412, thereby allocating specific subsets of PCEs 412 to individual LCEs 402. FIGS. 5A-5D illustrate exemplary mappings between LCEs 402 and PCEs 412.

FIGS. 5A-5D are exemplary illustrations of logical-to-physical copy engine mappings that may be implemented by the copy subsystem of FIG. 4, according to various embodiments of the present invention.

Figure 5A:
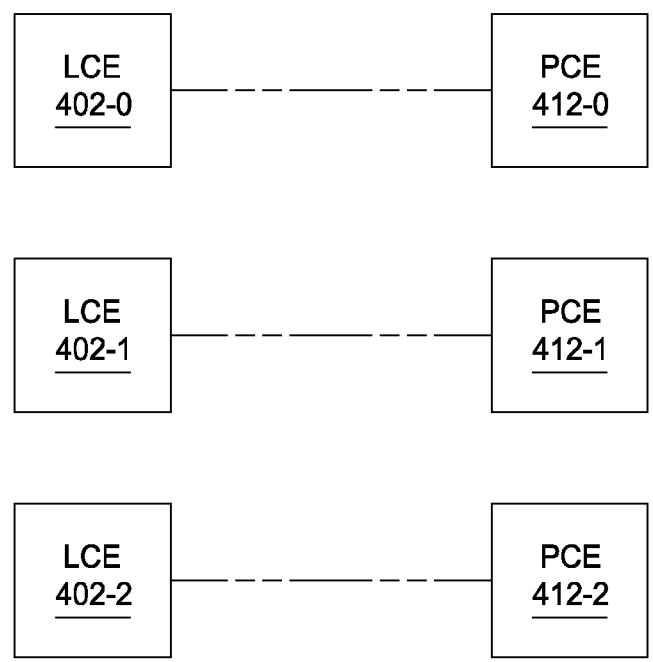
FIGS. 5A-5D are exemplary illustrations of logical-to-physical copy engine mappings that may be implemented by the copy subsystem of FIG. 4, according to various embodiments of the present invention.

As shown in FIG. 5A, LCEs 402-0 through 402-2 may be coupled to PCEs 412-0 through 412-2 according to a one-to-one mapping. In this configuration, each LCE 402 is allocated a dedicated PCE 412. When a given LCE 402 receives a copy command, the LCE 402 distributes the copy command to the corresponding PCE 412 for processing.

Figure 5B:
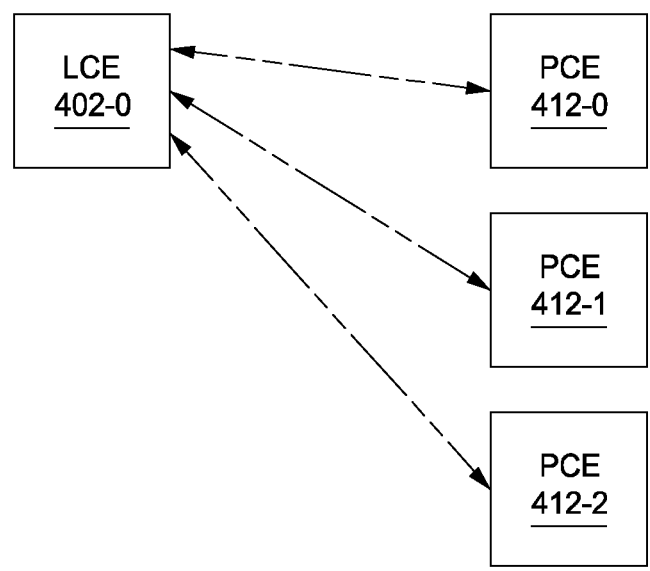

As shown in FIG. 5B, one LCE 402 may be coupled to PCEs 412-0 through 412-1 according to a one-to-many mapping. In this configuration, one LCE 402 is allocated many PCEs 412. When LCE 402-0 receives a copy command, LCE 402-0 may select a specific PCE 412 and then distribute the copy command to the selected PCE 412. In one embodiment, LCE 402-0 may implement a round-robin scheduling process for selecting a PCE 412.

Figure 5C:
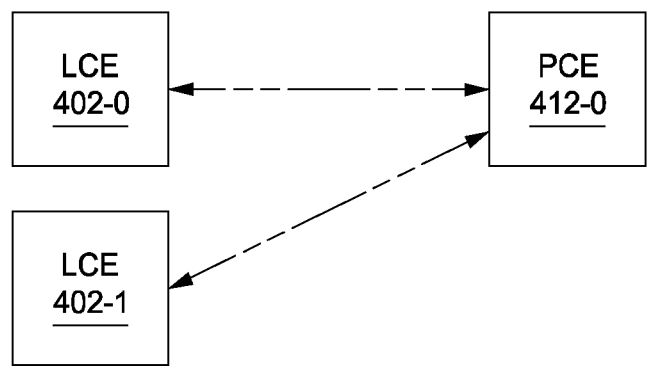

As shown in FIG. 5C, LCEs 402-0 and 402-1 may be coupled to PCE 412-0 according to a many-to-one mapping. In this configuration, LCEs 402-0 and 402-1 may time share usage of PCE 412-0. In doing so, LCEs 402 may rely on ARB 406 shown in FIG. 4 to manage the sharing of PCE 412. When either of LCEs 402-0 and 402-1 receive a copy command, that LCE 402 may interact with ARB 406 in order to determine a specific time when PCE 412-0 may process the copy command. The LCE 402 may then distribute the copy command to PCE 412-0 at the scheduled time. The mappings shown in FIGS. 5B and 5C may also be combined, as described below in conjunction with FIG. 5D.

Figure 5D:
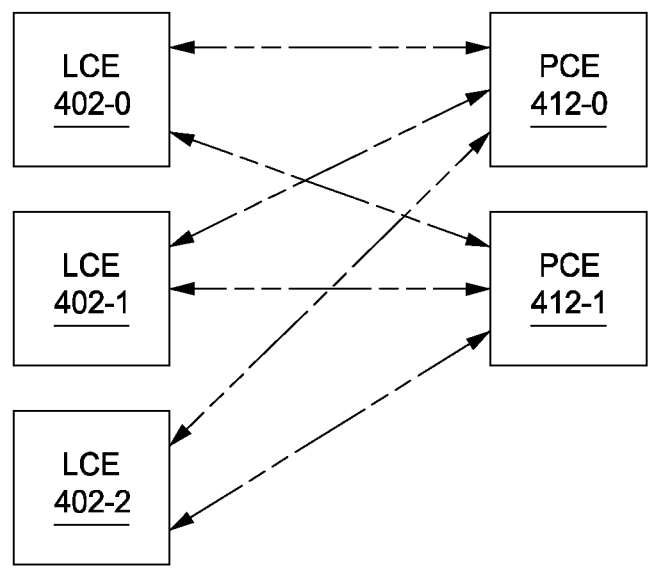

As shown in FIG. 5D, LCEs 402-0 through 402-2 may be coupled to PCEs 412-0 and 412-1 according to a many-to-many mapping. In this configuration, LCE 402 may perform copy operations with a shared pool of PCEs 412. When a given LCE 402 receives a copy command, that LCE 402 may implement a selection process (e.g., round robin, etc.) to select a PCE 412, and may also interact with ARB 406 to negotiate a time when the copy command is distributed to the selected PCE 412. Alternatively, ARB 406 may perform the selection and scheduling of PCEs 412 on behalf of LCEs 402, and LCEs 402 may simply distribute copy commands to PCEs 412 based on instructions received from ARB 406. In one embodiment, LCE 402-0 is dedicated to performing graphics-related copy operations, and LCE 402-1 is reserved for general copy operations. In this embodiment, LCEs 402-0 and 402-1 share access to PCEs 412-0 through 412-2 in order to perform both graphics-related and generic copy operations.

Referring generally to FIGS. 5A-5D, CE X-bar 410 is configured to implement any particular mapping between LCEs 402 and PCEs 412, including, but not limited to, the exemplary mappings discussed herein. CE X-bar 410 may implement a specific mapping depending on a set of configuration registers that reflects the operating parameters of copy subsystem 300 and/or PPU 202 where that copy subsystem resides. For example, if device driver 103 implements five command streams, but only two PCEs 412 are present within copy subsystem 300, then CE X-bar 410 may implement a version of the many-to-many mapping shown in FIG. 5D to map the five LCEs 402 associated with those five command streams to the two PCEs 412. Alternatively, if device driver 103 implements just one command stream, but four PCEs 412 are present within copy subsystem 300, then CE X-bar 410 may implement a version of the one-to-many mapping shown in FIG. 5B to map the one LCE 402 associated with that one command stream to the four different PCEs 412. The configuration registers mentioned above could be set, for example, by device driver 103. Upon initialization of copy subsystem 300, CE X-bar 410 may access the configuration registers to determine the specific LCE-to-PCE mapping to implement.

X-bar 410 is also configured to route resets and interrupts between LCEs 402 and PCEs 412 according the LCE-to-PCE mapping. For example, in FIG. 5A, if LCE 402-0 needed to be reset, then x-bar 410 could propagate that reset to PCE 412-0. Similarly, if PCE 412-0 generated an interrupt, x-bar 410 could propagate that interrupt upstream to LCE 402-0.

Referring back now to FIG. 4, each LCE 402 is configured to implement certain synchronization mechanisms when performing copy operations based on the specific LCE-to-PCE mapping implemented. These synchronization mechanisms coordinate parallel copy operations that may be distributed across multiple PCEs 412. Specifically, in one-to-many or many-to-many LCE-to-PCE mappings, each LCE may distribute multiple related copy operations across different PCEs 412. In such mappings, the synchronization mechanisms mentioned above may be used to manage dependencies between different copy operations, coordinate semaphore releases, and perform flush operations. These specific scenarios are described, by way of examples, below in conjunction with FIGS. 6-8.

Figure 6:
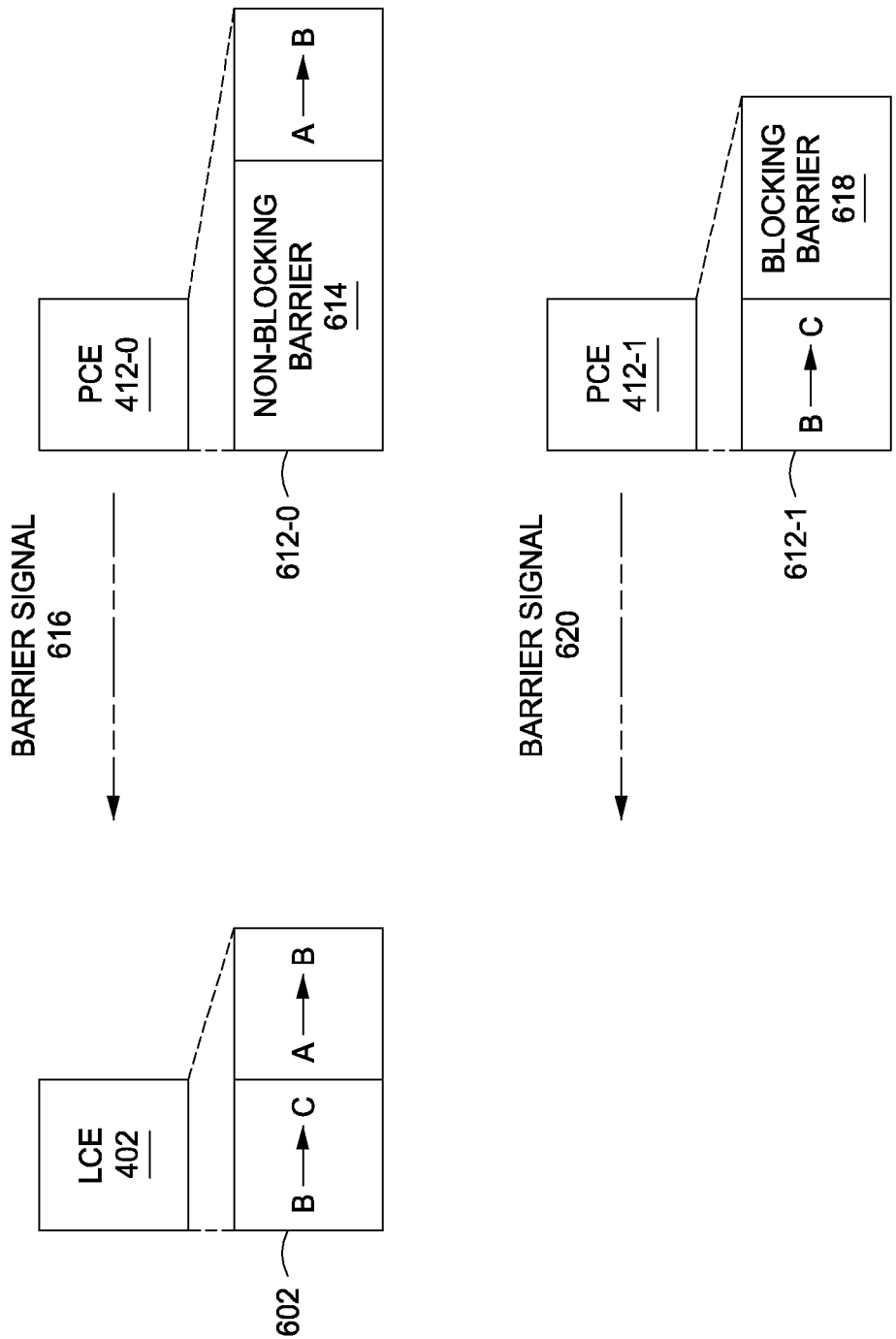
FIG. 6 illustrates an exemplary scenario where a logical copy engine in the copy subsystem of FIG. 4 manages multiple dependent copy operations by distributing barriers to physical copy engines, according to various embodiments of the present invention.

FIG. 6 illustrates an exemplary scenario where a logical copy engine in the copy subsystem of FIG. 4 coordinates multiple dependent copy operations by distributing barriers to physical copy engines, according to various embodiments of the present invention. As shown, LCE 402 is configured to operate in conjunction with PCEs 412-0 and 412-1. LCE 402 and PCEs 412-0 and 412-1 could be coupled together, for example, according to the mappings shown in FIG. 5B or 5D. LCE 402 includes a command queue 602, which, as is shown, includes two copy commands, A→B and B→C. Copy command A→B indicates that data from location A should be copied to location B. Copy command B→C indicates that data stored at location B should be copied to location C. Persons skilled in the art will recognize that copy command B→C is dependent on the completion of copy command A→B.

LCE 402 may distribute these two copy commands to different PCEs 412 in the manner shown. Each PCE 412 may then store the command in command queue 612 for processing. As shown, PCE 412-0 includes a command queue 612-0 that stores copy command A→B. PCE 412-1 includes a command queue 612-1 that stores copy command B→C. PCEs 412-0 and 412-1 are configured to operate in parallel with one another to copy data across parallel channels within communication links 310. However, due to the dependency between the two copy operations discussed herein, PCE 412-1 should not begin copying data from location B to location C until PCE 412-0 has finished copying data from location A to location B.

In order to coordinate these two copy operations to maintain proper ordering, LCE 402 is configured to distribute different barriers to PCEs 412. LCE 402 distributes a non-blocking barrier 614 to PCE 412-0 and a blocking barrier 618 to PCE 412-1. Non-blocking barrier 616, when processed by PCE 412-0, causes PCE 412-0 to transmit barrier signal 616. PCE 412-0 may then continue processing command queue 612-0. Blocking barrier 618, on the other hand, causes PCE 412-1 to transmit barrier signal 620 and to then stall operations until instructed otherwise by LCE 402. Generally, barrier signal 616 indicates to LCE 402 that copy operation A→B is complete. On the other hand, barrier signal 620 indicates to LCE 402 that copy operation B→C is stalled awaiting the completion of copy operation A→B.

PCE 412-1 may receive blocking barrier 618 and, in response, stall and transmit barrier signal 620. In one embodiment, barrier signal 620 causes LCE 402 to increment a counter, indicating that copy operation A→B is outstanding. Concurrently, PCE 412-0 performs copy operation A→B. When complete, PCE 412-0 processes non-blocking barrier 614 and transmits barrier signal 616. In one embodiment, barrier signal 616 causes LCE 402 to increment another counter, indicating that copy operation A→B is no longer outstanding. Then, LCE 402 releases PCE 412-1 and PCE 412-1 may safely perform copy operation B→C. The advantage of using barriers in this fashion is that copy execution can be blocked in a PCE 412 only when absolutely necessary, allowing the execution of unrelated copy operations to make progress without stalling.

Device driver 103 may cause LCEs 402 to distribute the blocking and non-blocking barriers described herein by marking specific copy commands as either "pipelined" or "non-pipelined." Copy operations associated with pipelined copy commands may be performed in parallel with one another. Non-pipelined copy commands involve copy operations that may not overlap with specific other copy operations, and may cause LCE 402 to distribute blocking barriers in the manner discussed above. As a general matter, LCEs 402 may distribute non-blocking and blocking barriers in order synchronize a wide variety of different operations, including dependent copy operations, as well semaphore releases (described below in conjunction with FIG. 7) and flush operations (described below in conjunction with FIG. 8).

Figure 7:
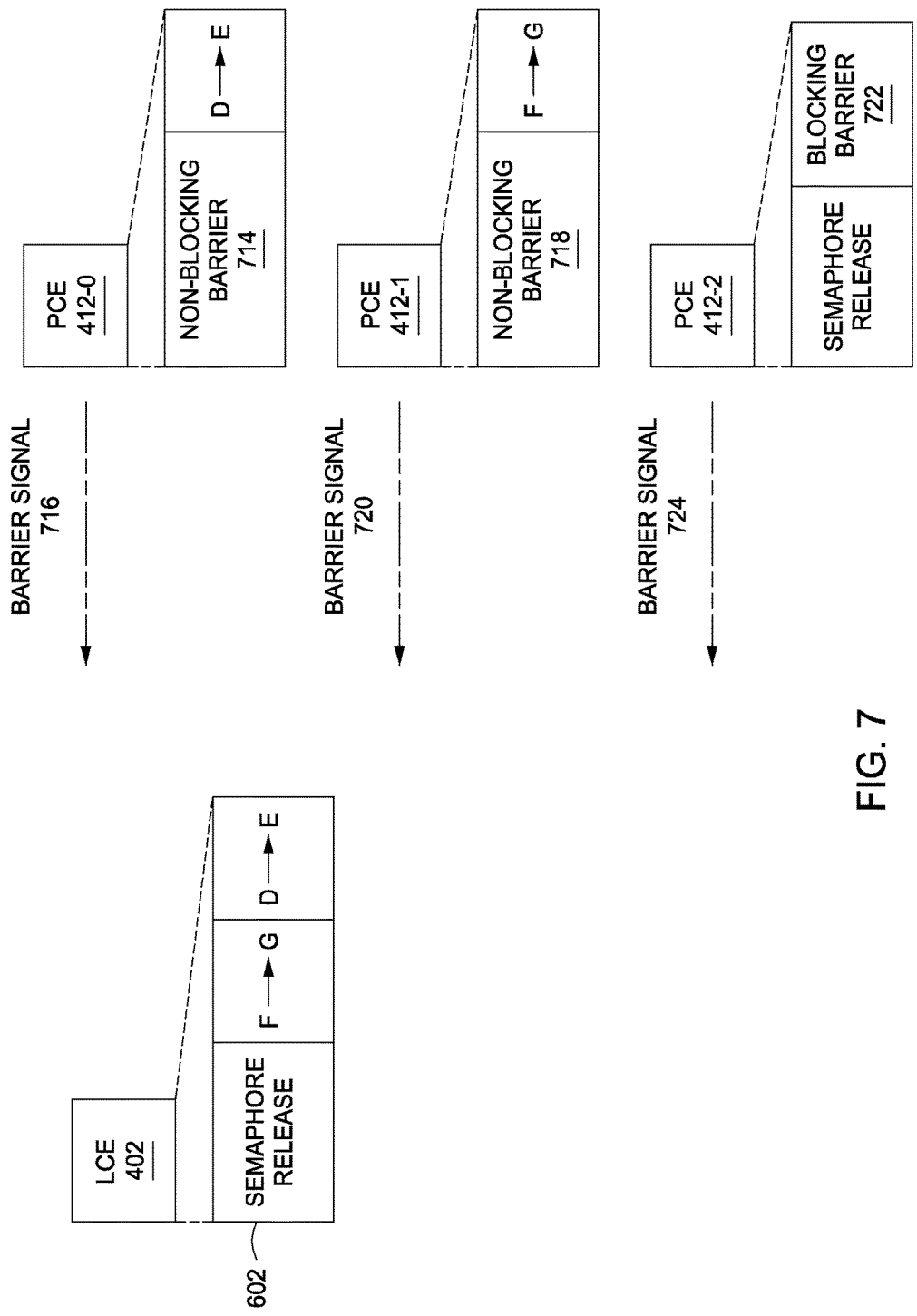
FIG. 7 illustrates an exemplary scenario where a logical copy engine in the copy subsystem of FIG. 4 manages a semaphore release operation by distributing barriers to physical copy engines, according to various embodiments of the present invention.

FIG. 7 illustrates an exemplary scenario where a logical copy engine in the copy subsystem of FIG. 4 coordinates a semaphore release operation by distributing barriers to physical copy engines, according to various embodiments of the present invention. As shown, LCE 402 is configured to operate in conjunction with PCEs 412-0, 412-1, and 412-2. LCE 402 and PCEs 412-0 through 412-2 could be coupled together, for example, according to the mappings shown in FIG. 5B or 5D. Command queue 602 includes two copy commands, D→E and F→G, and a semaphore release command. The semaphore release command is dependent on the successful execution of copy commands D→E and F→G.

LCE 402 distributes the different commands included in command queue 602 to PCEs 412-0 through 412-2 to be queued for execution. PCE 412-0 queues copy command D→E in command buffer 612-0, PCE 412-1 queues copy command F→G in command buffer 612-1, and PCE 412-2 queues the semaphore release command in command queue 612-2. LCE 402 also distributes various barriers to PCEs 412-0 through 412-2 to be queued for processing. PCE 412-0 queues non-blocking barrier 714 in command queue 612-0, PCE 412-1 queues non-blocking barrier 718 in command queue 612-1, and PCE 412-2 queues blocking barrier 722 in command queue 612-2.

When PCE 412-2 processes non-blocking barrier 722, PCE 412-2 transmits barrier signal 724 to LCE 402 to indicate that execution of the semaphore release command is stalled until PCEs 412-0 and 412-1 complete copy commands D→E and F→G, respectively. PCE 412-0 may then execute copy command D→E and subsequently process non-blocking barrier 714. PCE 412-0 then transmits barrier signal 716 to indicate that copy command D→E has been executed. Similarly, PCE 412-1 may then execute copy command F→G and subsequently process non-blocking barrier 718. PCE 412-1 then transmits barrier signal 720 to indicate that copy command F→G has been executed. When LCE 402 receives barrier signals 716 and 720, LCE 402 then notifies PCE 412-2 that execution of the semaphore release command may commence. In this fashion, LCE 402 distributes various types of barriers in order to synchronize operations across parallel PCEs 412. LCE 402 may perform a similar technique in order to perform a flush operation, as described below in conjunction with FIG. 8.

Figure 8:
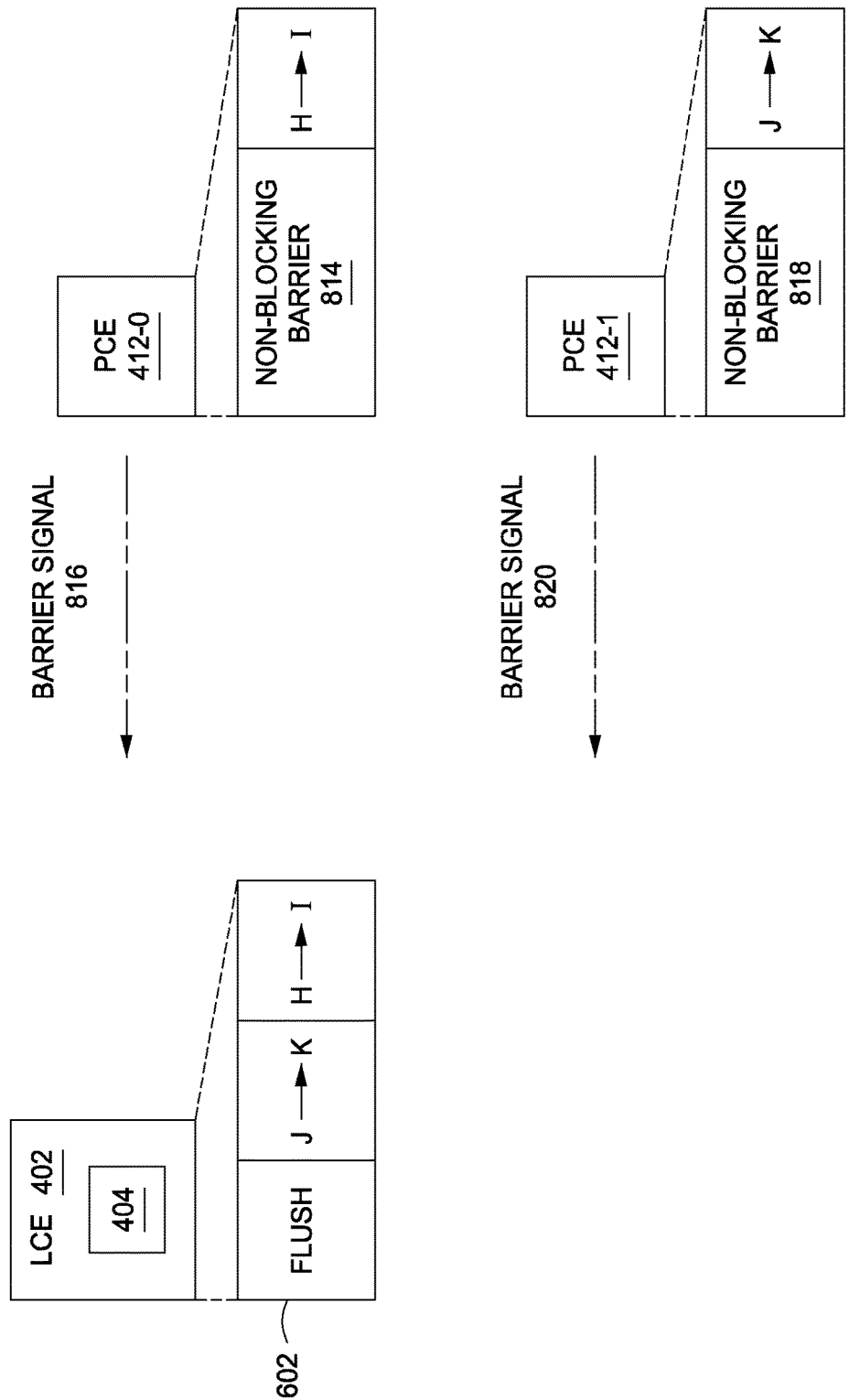
FIG. 8 illustrates an exemplary scenario where a logical copy engine in the copy subsystem of FIG. 4 manages a flush operation by distributing barriers to physical copy engines, according to various embodiments of the present invention.

FIG. 8 illustrates an exemplary scenario where a logical copy engine in the copy subsystem of FIG. 4 coordinates a flush operation by distributing barriers to physical copy engines, according to various embodiments of the present invention. As shown, LCE 402 is configured to operate in conjunction with PCEs 412-0 and 412-1. LCE 402 and PCEs 412-0 and 412-1 could be coupled together, for example, according to the mappings shown in FIG. 5B or 5D. Command queue 602 includes two copy commands, J→K and H→I, and a flush command. The flush command is to be performed on the completion of copy operations D→E and F→G.

When LCE 402 receives the flush command, LCE 402 may store that command in FIFO 404 for later processing. LCE 402 then distributes the different copy commands included in command queue 602 to PCEs 412-0 and 412-1 to be queued for execution. PCE 412-0 queues copy command H→I in command buffer 612-0, and PCE 412-1 queues copy command J→K in command buffer 612-1. LCE 402 also distributes various non-blocking barriers to PCEs 412-0 and 412-1 to be queued for processing. PCE 412-0 queues non-blocking barrier 814 in command queue 612-0, and PCE 412-1 queues non-blocking barrier 818 in command queue 612-1.

When PCE 412-1 processes non-blocking barrier 814, PCE 412-1 transmits barrier signal 816 to LCE 402 to indicate that copy command H→I was performed. Likewise, when PCE 412-1 processes non-blocking barrier 818, PCE 412-1 transmits barrier signal 820 to LCE 402 to indicate that copy command J→K was performed. When LCE 402 receives barrier signals 816 and 820, LCE 402 pops the flush command from FIFO 404 for execution.

Figure 9:
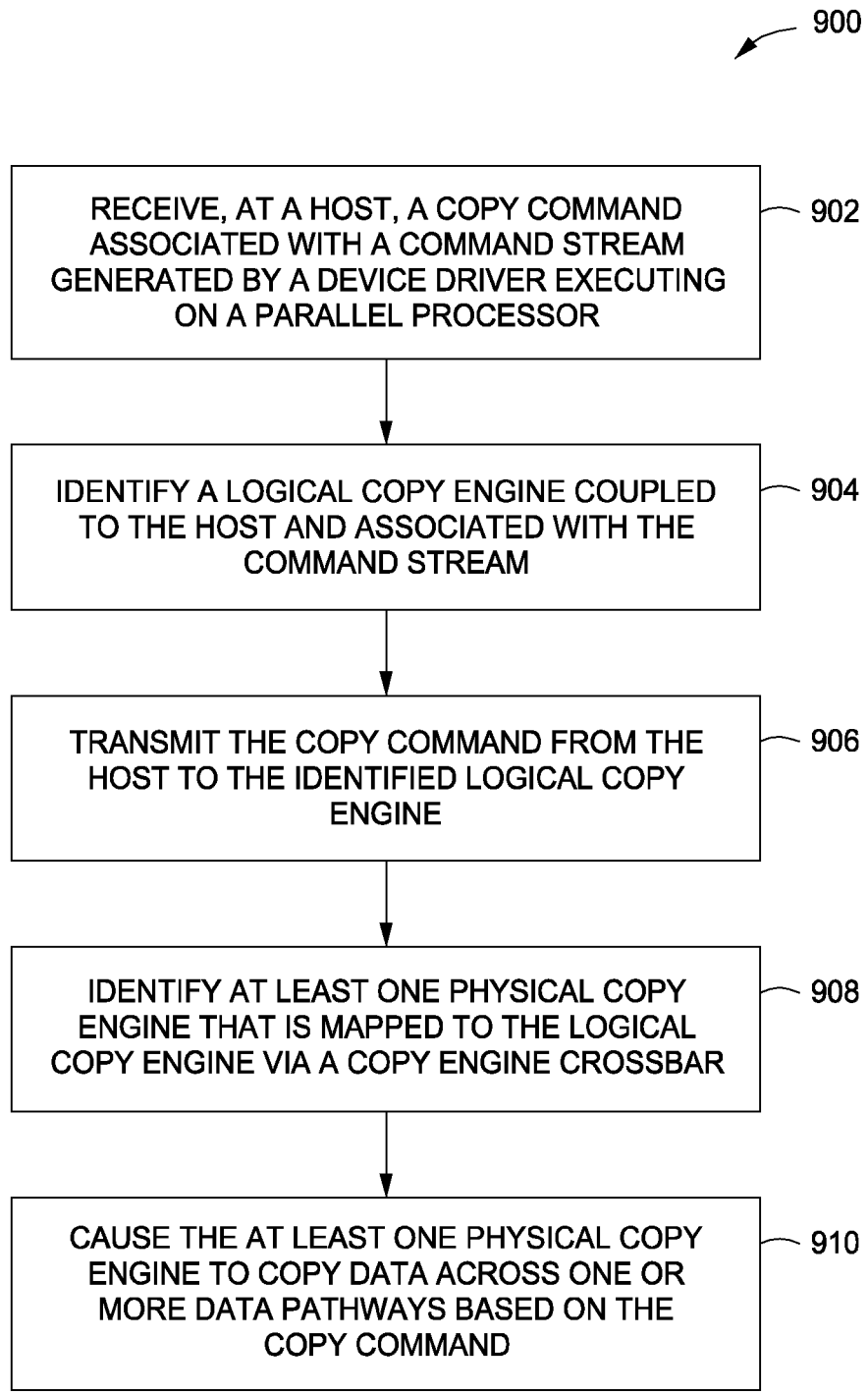
FIG. 9 is a flow diagram of method steps for distributing copy operations from a logical copy engine to one or more physical copy engines, according to various embodiments of the present invention.
Figure 10:
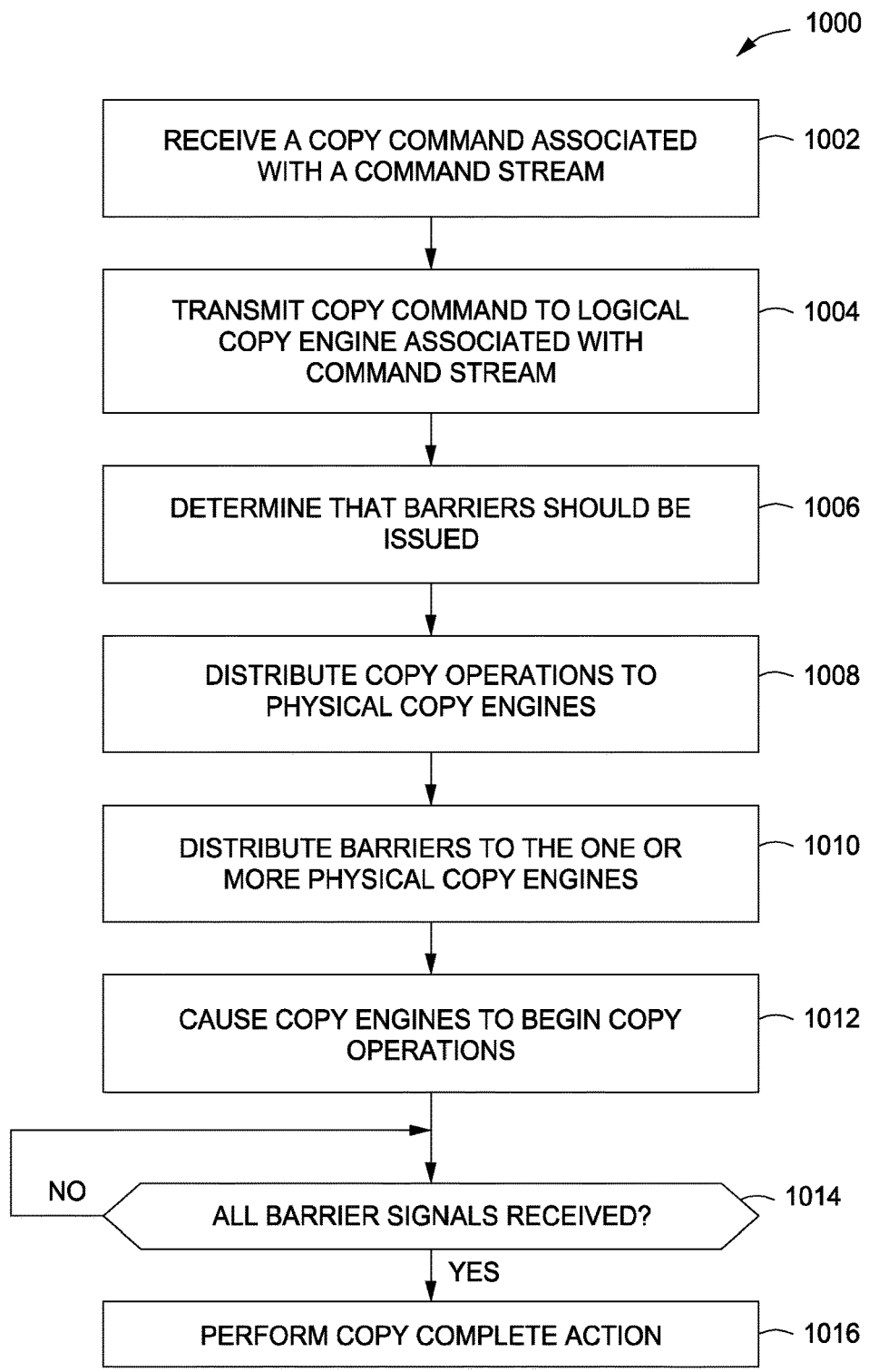
FIG. 10 is a flow diagram of method steps for managing copy operations distributed across multiple physical copy engines, according to various embodiments of the present invention.

Referring generally to FIGS. 6-8, copy subsystem 300 may implement any two or more of the coordination techniques discussed in those figures in conjunction with one another. For example, LCE 402 could coordinate PCEs 412 to perform the semaphore release discussed in FIG. 7, and then execute the flush command in like fashion as discussed in FIG. 8. FIGS. 9-10, described in greater detail below, set forth various techniques for perform copy operations.

FIG. 9 is a flow diagram of method steps for distributing copy operations from a logical copy engine to one or more physical copy engines, according to various embodiments of the present invention. Although the method steps are described in conjunction with the systems of FIGS. 1-8, persons skilled in the art will understand that any system configured to perform the method steps, in any order, is within the scope of the present invention.

As shown, a method 900 begins at step 902, where host 400 within copy subsystem 300 receives a copy command associated with a command stream that is generated by device driver 103 executing PPU 202. The command stream is associated with a specific LCE 402. At step 904, host 400 identifies that specific LCE 402 based on the command stream across which the copy command was received. At step 906, host 400 transmits the copy command to the LCE 402 identified at step 904.

At step 908, the LCE 402 receives the copy command and then identifies at least one PCE 412 that is mapped to the LCE 402 via CE X-bar 410. CE X-bar 410 may be configured to implement any of the LCE-to-PCE mappings shown in FIGS. 5A-5D. LCE 402 may identify the at least one PCE 412 based on the mapping implemented by CE X-bar 410.

At step 910, the LCE 402 causes the at least one PCE 412 identified at step 908 to copy data across one or more data pathways based on the received copy command. In doing so, the LCE 402 may transmit copy commands to the PCE 412 for execution. Also, the LCE 402 may split the copy command into a group of subcommands. The LCE 402 may also split associated copy data into smaller sub-portions of data. Then, the LCE 402 may distribute the subcommands across multiple PCEs 412 for processing. Each PCE 412 may then perform parallel copy operations with different channels of communication links 310, thereby saturating those communication links. LCE 402 may also distribute various barrier commands based on the received copy command, as described in greater detail below in conjunction with FIG. 10.

FIG. 10 is a flow diagram of method steps for managing copy operations distributed across multiple physical copy engines, according to various embodiments of the present invention. Although the method steps are described in conjunction with the systems of FIGS. 1-8, persons skilled in the art will understand that any system configured to perform the method steps, in any order, is within the scope of the present invention.

As shown, a method 1000 begins at step 1002, where host 400 within copy subsystem 300 receives a copy command associated with a command stream, similar to step 902 of the method 900 described above. At step 1004, host 400 transmits the copy command to the specific LCE 402 associated with the command stream, similar to step 904 of the method 900 described above.

At step 1006, the LCE 402 to which the copy command is transmitted at step 1004 determines that one or more blocking or non-blocking barriers should be issued to downstream PCEs 412. LCE 402 could, for example, identify that the copy command involves multiple copy sub-commands, as could be the case when a copy split occurs. Alternatively, LCE 402 could identify a semaphore release command and/or a flush command, either or both of which would be synchronized using barriers in the fashion discussed above in conjunction with FIGS. 7-8. In one embodiment, device driver 103 marks specific copy operations that should be synchronized (e.g., semaphore release, flush, etc.) by marking those operations as non-pipelined. LCE 402 may detect copy operations marked in this fashion and then distribute the appropriate barrier types to enable synchronization.

At step 1008, the LCE 402 distributes one or more copy operations to downstream PCEs 412 based on the copy command. At step 1010, the LCE 402 distributes the one or more blocking or non-blocking barriers to the one or more PCEs 412. The distribution of copy operations and barriers performed at steps 1008 and 1010 generally depends on the specific LCE-to-PCE mapping implemented by CE X-bar 410. As described above, CE X-bar 410 is configured to implement any particular mapping between LCEs 402 and PCEs 412, including, but not limited to, the exemplary mappings shown in FIGS. 5A-5D. CE X-bar 410 may implement a specific mapping depending on a set of configuration registers that reflects the operating parameters of copy subsystem 300 and/or PPU 202 where that copy subsystem resides At step 1012, the LCE 402 causes the one or more copy operations to commence. In doing so, LCE 402 causes each PCE 412 to which copy operations and/or barriers were distributed at steps 1008 and 1010, respectively, to begin processing a respective work queue. The work queue associated with a given PCE 412 may include multiple copy operations interspersed with blocking and/or non-blocking barriers.

At step 1014, the LCE 402 determines whether all expected barrier signals were received. In doing so, LCE 402 could, for example, monitor one or more counters that track outstanding barriers and/or received barrier signals. The LCE 402 may repeat step 1014 until all outstanding barrier signals are received, and then proceed to step 1016. At step 1016, the LCE 402 performs a "copy complete" action. In one embodiment, the copy complete action is the execution of a flush command. In another embodiment, the copy complete action involves notifying one or more PCEs 412 that a blocking barrier may be discarded and that subsequent processing of copy operations and/or barriers may commence.

In sum, a copy subsystem within a processor includes a set of logical copy engines and a set of physical copy engines. Each logical copy engine corresponds to a different command stream implemented by a device driver, and each logical copy engine is configured to receive copy commands via the corresponding command stream. When a logical copy engine receives a copy command, the logical copy engine distributes the command, or one or more subcommands derived from the command, to one or more of the physical copy engines. The physical copy engines can perform multiple copy operations in parallel with one another, thereby allowing the bandwidth of the communication link(s) to be saturated.

Advantageously, the processor can be configured with any number of different neighboring processors, and connected to those neighboring processors via communication links having any range of widths, without requiring the device driver to perform load balancing across the different links. Thus, the device driver can be far less complex that required by conventional approaches. Further, the copy subsystem is configured to handle copy operation synchronization, interrupts, page faults, and other exceptional conditions that would otherwise need to be managed by the device driver. Thus, the device driver can be programmed to perform robust copy operations via a consistent interface to the copy subsystem that does not change based on processor topology.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A copy subsystem, comprising:
   a first logical copy engine configured to receive a first set of copy commands transmitted by a device driver; and
   a first set of physical copy engines coupled to the first logical copy engine, wherein each physical copy engine is configured to:
      receive at least one command included in the first set of copy commands from the first logical copy engine; and
      execute the at least one command on behalf of the first logical copy engine.

2. The copy subsystem of claim 1, further comprising:
   a copy engine crossbar residing between the logical copy engine and the first set of physical copy engines and configured to:
      determine a mapping between one or more logical copy engines and one or more physical copy engines within the copy subsystem, and
      couple the first copy engine to each physical copy engine included in the first set of physical copy engines based on the mapping.

3. The copy subsystem of claim 2, wherein the first set of physical copy engines includes only one physical copy engine, and wherein the mapping indicates that the first logical copy engine is to be coupled only to the one physical copy engine.

4. The copy subsystem of claim 2, wherein the first set of physical copy engines includes a first physical copy engine and a second physical copy engine, and wherein the mapping indicates that the first logical copy engine is to be coupled to both the first physical copy engine and the second physical copy engine.

5. The copy subsystem of claim 4, wherein the first logical copy engine is configured to implement a round-robin scheduling policy in scheduling copy commands included in the first set of copy commands for execution by the first physical copy engine and the second physical copy engine.

6. The copy subsystem of claim 2, further comprising:
 a second logical copy engine configured to receive a second set of copy commands transmitted by the device driver; and
 a second set of physical copy engines coupled to the second logical copy engine, wherein each physical copy engine in the second set of physical copy engines is configured to:
  receive at least one command included in the second set of copy commands from the second logical copy engine; and
  execute the at least one command on behalf of the first logical copy engine.

7. The copy subsystem of claim 6, wherein the first set of physical copy engines includes only a first physical copy engine, the second set of physical copy engines includes only a second physical copy engine, and wherein the mapping indicates that the first logical copy engine is to be coupled to only the first physical copy engine and the second logical copy engine is to be coupled to only the second physical copy engine.

8. The copy subsystem of claim 6, wherein the first set of physical copy engines includes a first physical copy engine and a second physical copy engine, the second set of physical copy engines includes a third physical copy engine and a fourth physical copy engine, and wherein the mapping indicates that the first logical copy engine is to be coupled to at least the first physical copy engine and the second physical copy engine and the second logical copy engine is to be coupled to at least the third physical copy engine and the fourth physical copy engine.

9. The copy subsystem of claim 6, wherein at least one physical copy engine included in the first set of physical copy engines is also included in the second set of physical copy engines, and wherein the mapping indicates that both the first logical copy engine and the second logical copy engine are to be coupled to the at least one physical copy engine.

10. The copy subsystem of claim 9, further comprising an arbiter coupled to the first logical copy engine and to the second logical copy engine and configured to implement a timesharing policy to provide the first logical copy engine and the second logical copy engine with shared access to the at least one physical copy engine.

11. The copy subsystem of claim 6, further comprising:
 a host coupled to the first logical copy engine and the second logical copy engine and configured to:
  receive from the device driver the first set of commands within a first command stream that corresponds to the first logical copy engine;
  transmit the first set of commands to the first logical copy engine for execution;
  receive from the device driver the second set of commands within a second command stream that corresponds to the second logical copy engine; and
  transmit the second set of commands to the second logical copy engine for execution.

12. A computer-implemented method for copying data between processors, the method comprising:
 receiving, at a first logical copy engine, a first set of copy commands transmitted by a device driver; and
 distributing the first set of copy commands to a first set of physical copy engines, wherein each physical copy engine is configured to:
  receive at least one command included in the first set of copy commands from the first logical copy engine, to copy data to a processor, and
  execute the at least one command on behalf of the first logical copy engine.

13. The computer-implemented method of claim 12, further comprising:
 determining a mapping between one or more logical copy engines and one or more physical copy engines within the copy subsystem, and
 coupling the first copy engine to each physical copy engine included in the first set of physical copy engines based on the mapping.

14. The computer-implemented method of claim 13, wherein the first set of physical copy engines includes only one physical copy engine, and wherein the mapping indicates that the first logical copy engine is to be coupled only to the one physical copy engine.

15. The computer-implemented method of claim 13, wherein the first set of physical copy engines includes a first physical copy engine and a second physical copy engine, and wherein the mapping indicates that the first logical copy engine is to be coupled to both the first physical copy engine and the second physical copy engine.

16. The computer-implemented method of claim 15, wherein the first logical copy engine is configured to implement a round-robin scheduling policy in scheduling copy commands included in the first set of copy commands for execution by the first physical copy engine and the second physical copy engine.

17. The computer-implemented method of claim 13, further comprising:
 receiving, at a second logical copy engine, a second set of copy commands transmitted by a device driver; and
 distributing the second set of copy commands to a second set of physical copy engines, wherein each physical copy engine in the second set of copy engines is configured to execute at least one command included in the second set of copy commands on behalf of the second logical copy engine, to copy data to a processor.

18. The computer-implemented method of claim 17, wherein at least one physical copy engine included in the first set of physical copy engines is also included in the second set of physical copy engines, and wherein the mapping indicates that both the first logical copy engine and the second logical copy engine are to be coupled to the at least one physical copy engine.

19. The computer-implemented method of claim 17, further comprising:
 receiving from the device driver the first set of commands within a first command stream that corresponds to the first logical copy engine;

transmitting the first set of commands to the first logical copy engine for execution;

receiving from the device driver the second set of commands within a second command stream that corresponds to the second logical copy engine; and transmitting the second set of commands to the second logical copy engine for execution.

20. A system, comprising:
a first set of logical copy engines, including:
  a first copy engine configured to receive a first set of copy commands transmitted by a device driver, and
  a second copy engine configured to receive a second set of copy commands transmitted by the device driver;
a first set of physical copy engines coupled to the first logical copy engine, wherein each physical copy engine is configured to:
  receive at least one command included in the first set of copy commands from the first logical copy engine, and
  execute the at least one command on behalf of the first logical copy engine; and
a copy engine crossbar residing between the first set of logical copy engines and the first set of physical copy engines and configured to:
  determine a mapping between one or more logical copy engines and one or more physical copy engines within the copy subsystem, and
  couple to the first set of logical copy engines to the first set of physical copy engines based on the mapping.

* * * * *